United States Patent
Lim

(10) Patent No.: US 7,747,268 B2
(45) Date of Patent: Jun. 29, 2010

(54) HANDLING TALK BURST DENIALS IN GROUP COMMUNICATION SYSTEM SUPPORTING PTT SERVICE

(75) Inventor: Guk-Chan Lim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 813 days.

(21) Appl. No.: 11/191,371

(22) Filed: Jul. 27, 2005

(65) Prior Publication Data

US 2006/0142036 A1    Jun. 29, 2006

Related U.S. Application Data

(60) Provisional application No. 60/591,602, filed on Jul. 28, 2004.

(30) Foreign Application Priority Data

Dec. 29, 2004   (KR)   .................... 10-2004-0115567

(51) Int. Cl.
```
H04B 7/00      (2006.01)
H04M 3/42      (2006.01)
H04W 68/00     (2009.01)
H04B 1/38      (2006.01)
H04W 4/00      (2009.01)
H04B 7/216     (2006.01)
H04L 12/28     (2006.01)
H04L 12/413    (2006.01)
G06F 15/177    (2006.01)
G06F 15/173    (2006.01)
```
(52) U.S. Cl. .................... 455/518; 455/416; 455/458; 455/517; 455/574; 370/328; 370/335; 370/351; 370/447; 709/220; 709/223

(58) Field of Classification Search ............. 455/90.2, 455/79, 67.14, 573, 572, 567, 561, 522, 518, 455/519, 520, 521, 517, 515, 512, 509, 458, 455/455, 456.1, 452.1, 452.2, 426.1, 255, 455/41.2, 415, 416, 418, 56, 412.1, 414.1, 455/434, 437, 450, 456.3, 466, 507, 552.1, 455/564, 566, 574, 1, 419; 370/312, 328, 370/335, 337, 447, 218, 259, 260, 351, 352, 370/353, 354, 444, 462, 913; 709/220, 223
See application file for complete search history.

(56) References Cited

U.S. PATENT DOCUMENTS 6,295,284 B1 * 9/2001 Maggenti .................... 370/328

(Continued)

FOREIGN PATENT DOCUMENTS

EP     1 071 295 A2    7/2000

(Continued)

*Primary Examiner*—Nay A Maung
*Assistant Examiner*—Paul P Tran
(74) *Attorney, Agent, or Firm*—Lee, Hong, Degerman, Kang & Waimey

(57) ABSTRACT

A method for processing a talk burst of a PTT server when a PTT terminal requests permission to send a talk burst, but the talk burst has already been allocated to another PTT terminal. The PTT server sends to every PTT terminal having a session established therefor, a talk burst deny message including an ID of the PTT terminal having sent the talk burst request message. Then, each PTT terminal having received the talk burst deny message compares its own ID with the ID included in the talk burst deny message and outputs the comparison result, such that the request for permission to send the talk burst can be processed and every user can check the status information of all PTT terminals having a session established thereof.

12 Claims, 3 Drawing Sheets

U.S. PATENT DOCUMENTS

| | | | |
|---|---|---|---|
| 6,301,263 B1 | 10/2001 | Maggenti | |
| 6,594,247 B2 | 7/2003 | Perkins et al. | |
| 6,928,294 B2* | 8/2005 | Maggenti et al. | 455/518 |
| 7,035,658 B2 | 4/2006 | Drozt et al. | |
| 7,079,857 B2* | 7/2006 | Maggenti et al. | 370/447 |
| 7,151,946 B2* | 12/2006 | Maggenti et al. | 455/517 |
| 7,299,075 B2* | 11/2007 | Gottlieb et al. | 455/566 |
| 7,319,879 B2* | 1/2008 | Harris et al. | 455/458 |
| 2001/0044299 A1 | 11/2001 | Sandegren | |
| 2002/0061760 A1* | 5/2002 | Maggenti et al. | 455/518 |
| 2002/0102999 A1 | 8/2002 | Maggenti et al. | |
| 2002/0150091 A1 | 10/2002 | Lopponen et al. | |
| 2003/0235184 A1 | 12/2003 | Dorenbosch et al. | |
| 2004/0082352 A1 | 4/2004 | Keating et al. | |
| 2004/0171400 A1* | 9/2004 | Rosen et al. | 455/518 |
| 2005/0002407 A1 | 1/2005 | Shaheen et al. | |
| 2005/0124365 A1* | 6/2005 | Balasuriya et al. | 455/518 |
| 2005/0143135 A1* | 6/2005 | Brems et al. | 455/564 |
| 2005/0176454 A1* | 8/2005 | Chakraborty et al. | 455/518 |
| 2005/0239486 A1* | 10/2005 | D'Avello et al. | 455/519 |
| 2006/0002328 A1 | 1/2006 | Naghian | |

FOREIGN PATENT DOCUMENTS

| | | |
|---|---|---|
| JP | 07-303245 | 11/1995 |
| JP | 08-116570 | 5/1996 |
| JP | 2001346267 | 12/2001 |
| JP | 2003219032 | 7/2003 |
| WO | WO 03036801 | 5/2003 |
| WO | WO 2004/062302 A3 | 7/2004 |

\* cited by examiner

HANDLING TALK BURST DENIALS IN GROUP COMMUNICATION SYSTEM SUPPORTING PTT SERVICE

CROSS-REFERENCE TO RELATED APPLICATIONS

This application claims the benefit of earlier filing date and right of priority to U.S. Provisional Application No. 60/591,602 and Korean Application No. 10-2004-0115567, filed on Jul. 28, 2004 and Dec. 29, 2004, respectively, the contents of which are hereby incorporated by reference herein in their entirety.

BACKGROUND OF THE INVENTION

1. Field of the Invention

The present invention relates to a PTT (Push-to-Talk) service, and particularly, to a method for processing a talk burst (e.g., right to speak, floor request) of a PTT service by which, when one PTT terminal requests permission to send a talk burst, while the talk burst has already been allocated to another PTT terminal, and a PTT server denies the request for the permission to send the talk burst.

2. Background of the Related Art

PTT (Push-To-Talk) refers to a half-duplex communication scheme whereby only one user is given a right to talk (i.e., floor grant, talk burst grant, etc.), as in a walkie-talkie service, and provides a one-to-one or one-to-many call conversation service. In other words, a user that has been granted the right to talk is said to have been granted the "floor" or granted a "talk burst", and these expressions can thus be used interchangeably.

In general, a PTT service system includes a PTT terminal having a PTT key (button) used for requesting permission to send a talk burst (i.e., a floor request), and a PTT server for controlling a talk burst (e.g., right to speak, floor control, etc.) and transmission of voice and data between the PTT terminals. Namely, talk burst requests (or floor requests) from various users are granted or denied by the PTT server such that only one user (PTT terminal) at a time has the right to talk while other users must listen.

In the PTT service system having such configuration, when a user presses a key of a PTT terminal to request permission to send a talk burst, if the talk burst has not been allocated to another PTT terminal, the PTT server sends a talk burst grant (floor grant) message to the corresponding PTT terminal that requested talk burst permission. However, if the talk burst has already been allocated to another PTT terminal, the PTT server sends a talk burst deny (floor deny) message to the corresponding PTT terminal.

The talk burst deny message indicates that when a user of a PTT terminal requests permission to send a talk burst while another PTT terminal already has the talk burst, the PTT server cannot allocate the talk burst to the PTT terminal having requested the talk burst. Namely, in the related art PTT service system, the PTT server sends the talk burst deny message only to the PTT terminal that sent a talk burst request message.

In general, a call conversation can be freely made in bi-directional communications without any distinction between the speaker and the listener. However, in half-duplex communications, such as a PTT service, the speaker and the listener are clearly distinguished and only a user who has a talk burst can be the speaker.

As mentioned above, the related art PTT service is disadvantageous in that, if a particular user has a talk burst, he does not know about any information regarding the state of other PTT terminals which have no talk burst, i.e., that do not have the right to speak.

BRIEF DESCRIPTION OF THE INVENTION

Therefore, it is an object of the present invention to provide a method for processing a talk burst of a PTT service by which, when a talk burst deny message occurs, the talk burst deny message is sent to every PTT terminal having a session established therefor so that each PTT terminal can check information on a PTT terminal which has requested permission to send a talk burst.

To achieve these and other advantages and in accordance with the purpose of the present invention, as embodied and broadly described herein, there is provided a server of a group communication system, comprising: a transceiver to send and receive communication signals; a processor cooperating with the transceiver; and a storage medium containing instructions executable by the processor to perform the steps of, receiving a floor request from a particular user terminal, granting or denying the floor request of the particular user terminal, and informing each user terminal about a floor request status of all user terminals having a session established thereof.

Here, the granting or denying the floor request can be performed based upon conditions of the group communication system, wherein the conditions can include a situation where the floor request has already been granted to another user terminal other than the particular user terminal that sent the floor request. The informing step may comprise, sending a floor deny message that identifies the particular user terminal, if the floor request is denied for that particular user terminal. Here, the floor deny message can have a first field indicating a broadcast mode transmission, a second field indicating a floor request denial, and a third field indicating an identification of the particular user terminal that sent the floor request which was denied. Also, the group communication system can support a push-to-talk function.

Also, the present invention provides a user terminal of a group communication system, comprising: a transceiver to send and receive communication signals; a processor cooperating with the transceiver; and a storage medium containing instructions executable by the processor to perform the steps of, sending a floor request to a server, receiving a floor grant or a floor deny from the server; and indicating a floor request status of all user terminals having a session established thereof.

Here, the receiving step can comprise, receiving a floor deny message that includes an identity of a particular user terminal which received a floor deny. Also, the indicating can be provided to a user through audible, visual or tactile indication or any combination thereof, wherein the indicating can be displayed via graphics image processing. The group communication system can support a push-to-talk function.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE INVENTION

Figure 1:
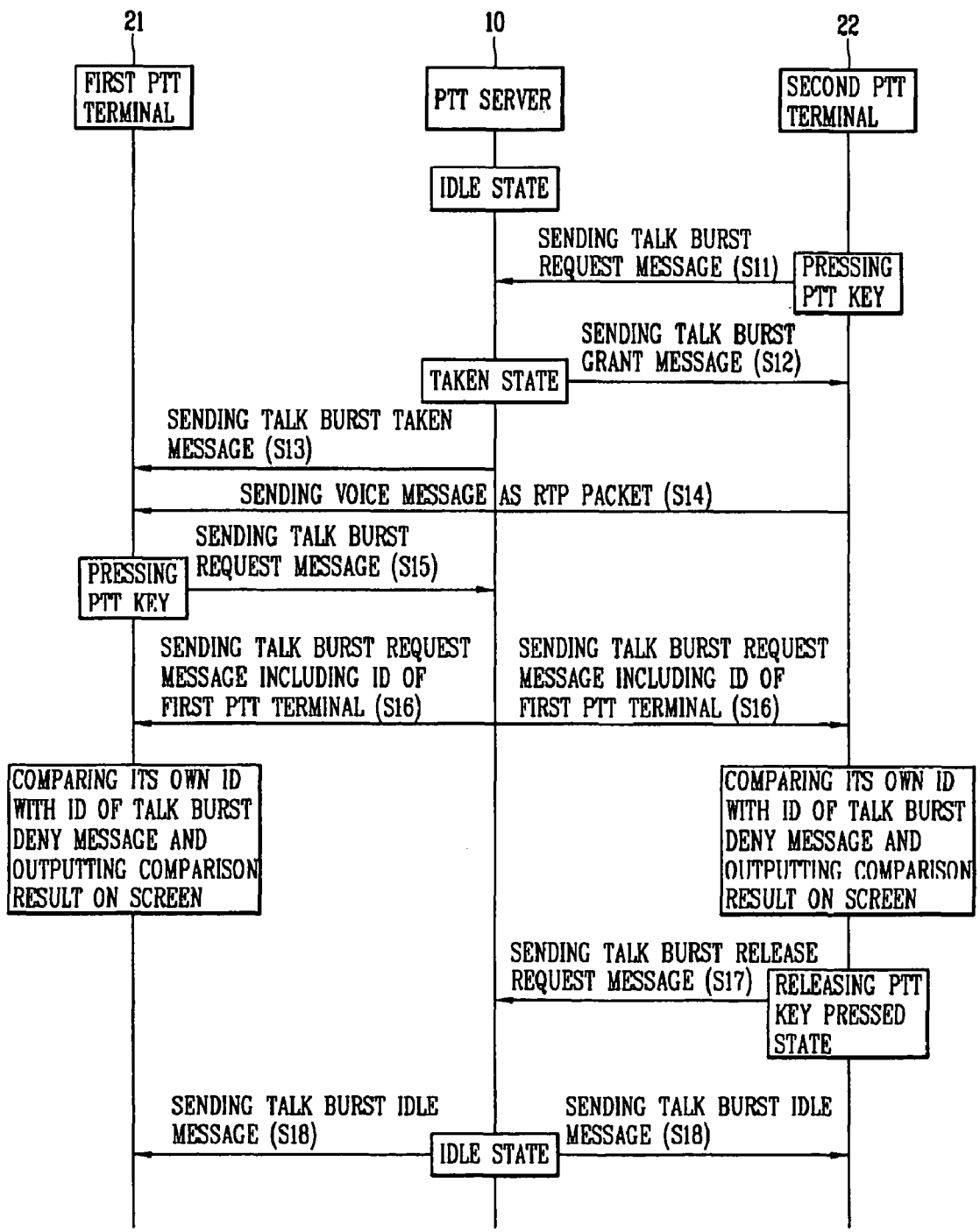
FIG. 1 is a signal flow chart which illustrates a method for processing a talk burst in accordance with the present invention.

Hereafter, some preferred embodiments of the present invention will be explained in detail by referring to the accompanying drawings. In the following description, some well-known functions or constructions are not described in detail because doing so may obscure the invention in unnecessary detail. Several exemplary embodiments of the present invention that may be used separately or in any combination to achieve talk burst allocation will be described in more detail hereafter.

Push-To-Talk, commonly abbreviated as PTT, is a method of conversing on half-duplex communication lines by pushing a button to allow voice communication to be transmitted and releasing the button to allow voice communication to be received. Such PTT features are being implemented in recent mobile terminals (e.g., mobile phones, handsets, wireless devices, etc.), allowing a mobile terminal to function as a digital two-way radio (e.g., a walkie-talkie) in push-to-talk operation. One person at a time can talk by pressing a PTT button and one or several others can listen instantly. Certain PTT schemes are based on 2.5G packet-switched networks (e.g., CDMA, GPRS, etc.) and use particular protocols, namely, SIP (Session Initiation Protocol) and RTP (Real Time Transport Protocol). These particular versions of PTT are called "Push-To-Talk over Cellular" (or Push-over-Cellular), commonly abbreviated as PoC.

As cellular communication networks continue to evolve and accommodate the transferring of various types of data (voice, images, audio, video, multimedia, etc.), various Internet access technologies are being employed. An example would be the Internet Protocol (IP), which is a data-oriented protocol used by source and destination hosts for communicating data across a packet-switched network (e.g., the Internet), and examples include IPv4, IPv6, and the like.

Among the numerous features of PTT (including a particular type of PTT called PoC), the floor control procedures related to a server (e.g., a PTT server) and a client (e.g., a PTT client) will be considered hereafter. In particular, the server can be considered as a centralized point that grants a "floor" to a PTT user who wishes to speak to a talk group. Namely, a user can "take the floor" and speak to other users who can only listen during that time. The client includes various mechanisms to facilitate the priority allocation required in granting the floor to the user.

When multiple users wish to take the floor (in order to talk with other users) by respectively sending a transmission request (e.g., a floor request, a talk burst request, etc.), priorities should be allocated such that the users take turns in speaking by considering whether their transmission requests that have been granted or denied. For example, the priorities may be allocated on a first come first served basis. For each transmission request from each client, the server may either grant or deny each request based upon the communications environment or other factors thereof.

In the present invention, talk burst allocation can also be referred to as obtaining the right to talk (or right to speak) or obtaining permission to transmit (access request). A user that is granted the right to talk is said to have been granted the "floor" or granted a "talk burst", and these expressions can be used interchangeably.

In the present invention, when one PTT terminal requests permission to send a talk burst in a state that another PTT terminal already has the talk burst, the PTT server sends a talk burst deny message not only to the PTT terminal which sent the talk burst request message, but also to every PTT terminal having a session established therefor, so that the request for the permission to send the talk burst can be processed and every PTT terminal can check the information about the status of other PTT terminals.

Here, the talk burst deny message is set as broadcasting mode such that it may be sent to all PTT terminals having a session established therefor, and includes an identity (ID) of the PTT terminal that sent the talk burst request message.

In the present invention, a PTT terminal having received the talk burst deny message compares its own ID with the ID included in the talk burst deny message. When the two IDs are identical, the PTT terminal outputs a message indicating talk burst request failure, but when the IDs are different, the PTT terminal outputs a message indicating that the talk burst request of the PTT terminal corresponding to the ID included in the talk burst deny message has been denied.

FIG. 1 is a signal flow chart which illustrates a method for processing a talk burst of a PTT service in accordance with the present invention, wherein the method is for a case where one PTT terminal requests permission to send a talk burst while another PTT terminal has already obtained a talk burst.

First, it is assumed that a first PTT terminal 21 establishes a session with a second PTT terminal 22 through a PTT server 10, and the PTT server 10 is in an idle state in which no talk burst is allocated. Here, a "session" refers to a communications relationship or link between two or more user devices (e.g., PTT terminals) during which voice and data can be sent and received.

When a user of the second PTT terminal 22 presses a PTT key, the second PTT terminal 22 sends a talk burst request (i.e., floor request) message to the PTT server 10 (S11).

The PTT server 10 having received the talk burst request message changes its status from "idle" to "taken" (operating state), sends a talk burst grant message to the second PTT terminal 22 (S12) and sends a talk burst taken message to the first PTT terminal 21, thereby allocating the talk burst (S13). Here, the talk burst taken message is sent to all PTT terminals excluding the PTT terminal having taken the talk burst so as to notify the PTT terminals of an ID of the PTT terminal having taken the talk burst.

When the user inputs voice or data through the second PTT terminal 22, the voice or data is sent as a RTP packet to the first PTT terminal 21 through the PTT server 10 (S14).

If the talk burst request message is sent from the first PTT terminal 21 while the talk burst is allocated to the second PTT terminal 22 (S15), the PTT server 10 cannot allocate the talk burst to the first PTT terminal 21 because it has already allocated the talk burst to the second PTT terminal 22. Accordingly, the PTT server 10 sends a talk burst deny message to every PTT terminal having a session established therefor, namely, to the first PTT terminal 21 and the second PTT terminal 22 (S16). Here, the talk burst deny message includes an ID of the first PTT terminal 21 having sent the talk burst request message.

The first PTT terminal 21 and the second PTT terminal 22 having received the talk burst deny message respectively compares their own IDs with the ID of the first PTT terminal 21 included in the talk burst deny message. When the IDs are identical, a message indicating that it has failed to take the talk burst is outputted to a screen of the corresponding PTT terminal, and when the IDs are different, a message indicating that the request for the permission to send the talk burst has been denied and an ID of the PTT terminal having sent the talk burst request message are indicated on the corresponding PTT terminal. This indication can be achieved through audible, visual or tactile means or any combination thereof, such as outputting a message on a display screen of the PTT terminal.

When the second PTT terminal 22 releases a pressed state of the PTT key, the second PTT terminal 22 sends a floor release message to the PTT server (S17). The PTT server having received the floor release message converts its state into an idle state and simultaneously, a floor idle message is sent to every PTT terminal having a session established therefor, namely to the first PTT terminal and the second PTT terminal (S18).

Figure 2:
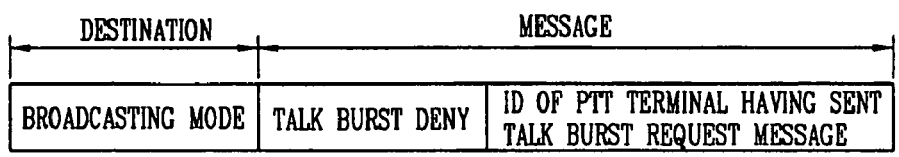
FIG. 2 is a view which illustrates a format of a talk burst deny message in accordance with the present invention.

FIG. 2 depicts a format of the talk burst deny message, which includes a destination field where a destination of a message is inputted, a talk burst deny field, and a field where an ID of a PTT terminal having sent the talk burst request message is inputted. Here, because the talk burst deny message is sent to every PTT terminal having a session established therefor, the destination field is set to a broadcasting mode.

As for the talk burst deny message in accordance with the present invention, the destination field is set to the broadcasting mode, and the talk burst deny message in accordance with the present invention has a format in which a field including an ID of a PTT terminal having sent the talk burst request message is added to the related art talk burst deny message format.

The PTT terminal having received the talk burst deny message compares an ID included in the talk burst deny message with its own ID and outputs a message according to the comparison result to a screen of the corresponding PTT terminal so that the user can recognize the talk burst denied state.

Figure 3:
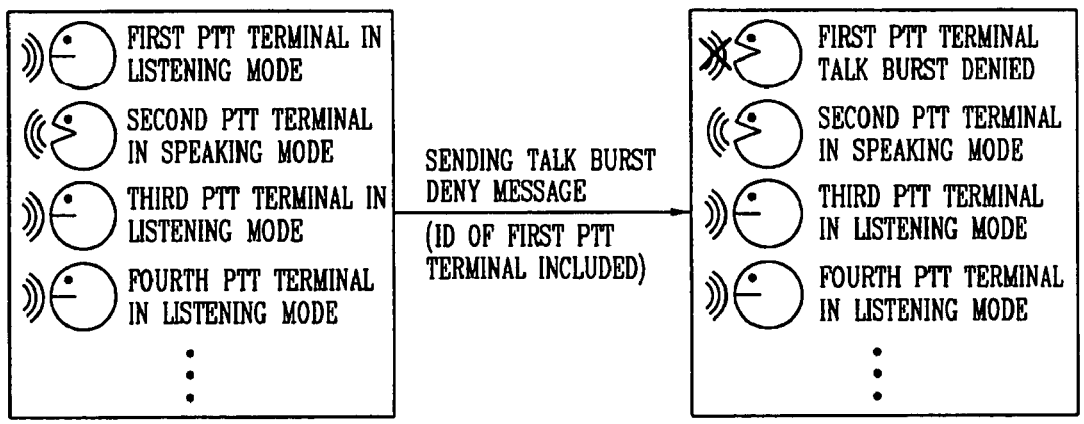
FIG. 3 is a view which illustrates an embodiment of a screen output of a PTT terminal which has received the talk burst deny message.
Figure 4:
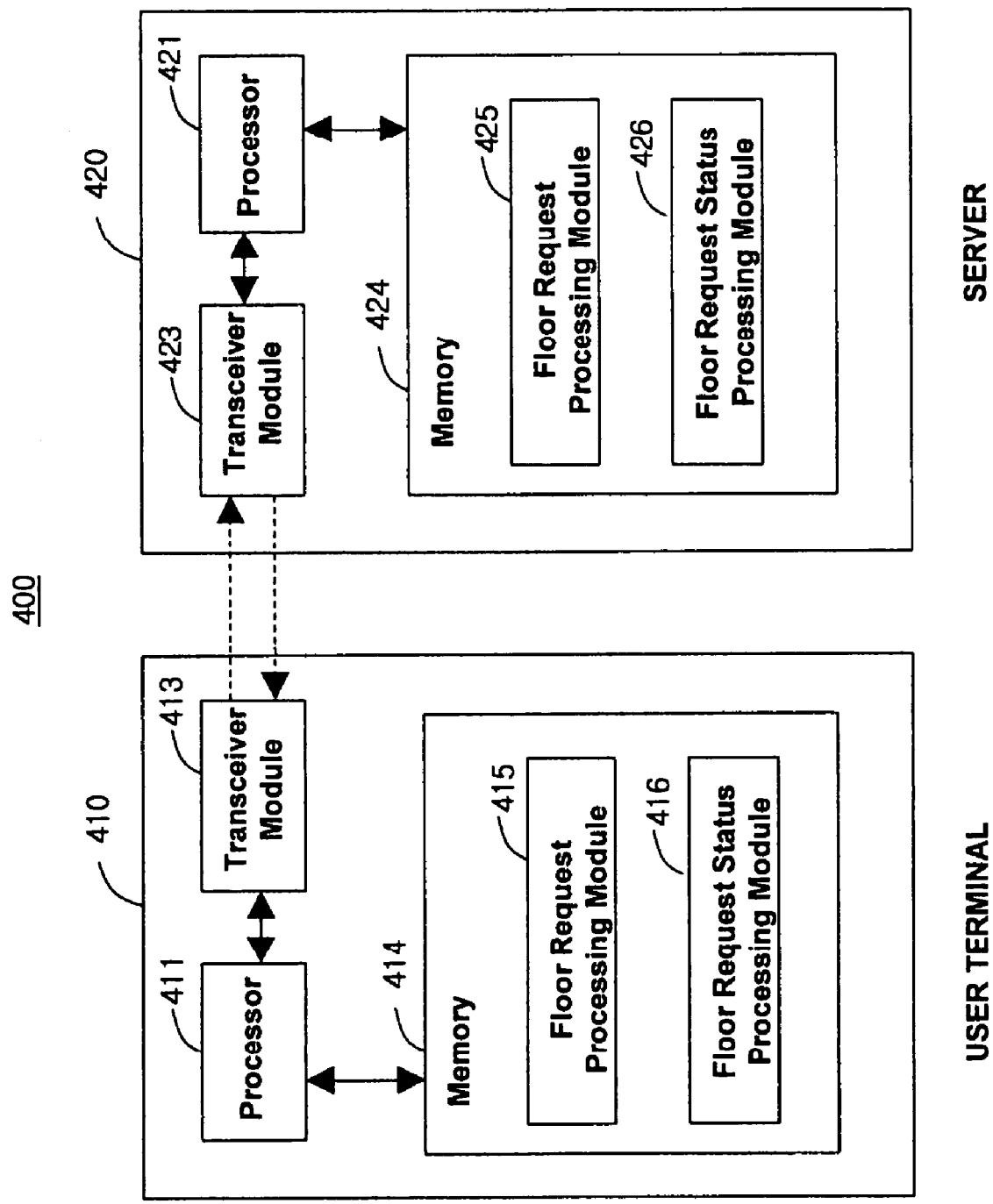
FIG. 4 depicts a group communication system showing a server and a single user terminal according to the present invention, although many user terminals may be employed.

FIG. 3 shows one embodiment of display of a screen of the PTT terminal having received the talk burst deny message. When the first PTT terminal sends a talk burst request message while a speech using the second PTT terminal having taken the talk burst is in progress, contents as shown in the embodiment of FIG. 3 are outputted to every PTT terminal having a session established therefor.

A state of every PTT terminal having a session established therefor may be outputted by using characters or icons using images or animation, as show in FIG. 3. Also, the state of the PTT terminal may be displayed only by characters or only by predefined icons.

The present invention can be embodied as software, hardware, or a combination of both. For example, talk burst allocation method according to the present invention can be embodied as codes or commands in a software program that can be stored in a storage media (such as an internal memory of the user terminal, a flash memory, etc.) and that can be executed by a processor (such as a microprocessor within the user terminal).

The present invention provides a server (420) of a group communication system (400), comprising: a transceiver (423) to send and receive communication signals; a processor (421) cooperating with the transceiver; and a storage medium (424) containing instructions (425, 426) executable by the processor to perform the steps of, receiving a floor request from a particular user terminal, granting or denying the floor request of the particular user terminal, and informing each user terminal about a floor request status of all user terminals having a session established thereof.

Here, the granting or denying the floor request can be performed based upon conditions of the group communication system, wherein the conditions can include a situation where the floor request has already been granted to another user terminal other than the particular user terminal that sent the floor request. The informing step may comprise, sending a floor deny message that identifies the particular user terminal, if the floor request is denied for that particular user terminal. Here, the floor deny message can have a first field indicating a broadcast mode transmission, a second field indicating a floor request denial, and a third field indicating an identification of the particular user terminal that sent the floor request which was denied. Also, the group communication system can support a push-to-talk function.

Also, the present invention provides a user terminal (410) of a group communication system (400), comprising: a transceiver (413) to send and receive communication signals; a processor (411) cooperating with the transceiver; and a storage medium (414) containing instructions (415, 416) executable by the processor to perform the steps of, sending a floor request to a server, receiving a floor grant or a floor deny from the server; and indicating a floor request status of all user terminals having a session established thereof.

Here, the receiving step can comprise, receiving a floor deny message that includes an identity of a particular user terminal which received a floor deny. Also, the indicating can be provided to a user through audible, visual or tactile indication or any combination thereof, wherein the indicating can be displayed via graphics image processing. The group communication system can support a push-to-talk function.

As described so far, in the method for processing a talk burst of the PTT service in accordance with the present invention, when users request permission to send a talk burst while the talk burst is allocated to a particular user, a talk burst deny message including an ID of each PTT terminal having sent the talk burst request message is sent to every PTT terminal having a session established therefor, so that each user participating in the session can check state information of other users with respect to the talk burst request even during a telephone conversation.

Also, in the method for processing a talk burst of the PTT service in accordance with the present invention, because each PTT terminal can output state information with respect to the talk burst request only by a process in which a PTT server sends the same talk burst deny message to every PTT terminal having a session established therefor, the PTT server does not need to have an additional function for managing and controlling the state information of each PTT terminal and can implement improved functions without increasing its functions or loads.

The features of the present invention are applicable to group (point-to-multipoint) communications, such as half-duplex communications like PTT (and PoC, which is a type of PTT), that allow voice and data communication to be transmitted upon activating a feature (e.g., by pushing a button, upon selecting a soft key, etc.) and allow voice and data communication to be received upon de-activating the feature (e.g., releasing the button, de-selecting the soft key, etc.).

Additionally, it can be clearly understood that the teachings and suggestions of the present invention can also be applicable and are intended to be applied to the so-called "Push-To-x" (PTx) techniques, because PTx is an enhancement of PTT and PoC technologies. Here, PTx refers to an enhanced version of PTT capable of supporting not only voice communications, but also various types of multimedia applications (e.g., photos, ringtones, games, content, SMS, MMS, etc.). An example of PTx is the so-called "Push-To View" (PTV) technology that can allow users to engage in multi-user video conferencing. PTx is expected to change the way we communicate when using mobile or wireless devices. The so-called "push-to" interface can be the main tool for connecting multiple users. Namely, the user's contact list (e.g., a so-called "buddy list") can be the center and starting point for the user's communication experience. By selecting a "push-to-x" function, the user will be able to launch various types of applications and communication sessions, including PTT, video conferencing, sending photos, and not to mention, placing ordinary phone calls. Each user's state of presence ("presence") will be an important component for the user to interface with his contact list. Namely, when the user activates the PTx function, a contact list containing various persons ("buddies") may be displayed with a list of options for each contact person based on their state of presence, capabilities of their mobile terminal or device, interoperability of their network, and the like. Here, the user may interface with his mobile terminal or wireless device through audible, visual, and/or tactile alerts or notifications.

Regarding the terminology used herein, it should be noted that PTT is also referred to as "P2T," and PTx is also referred to as "P2x," and PTV is also referred to as "P2V". Other similar abbreviations or acronyms may also be used to refer to the same basic concepts regarding various "push-to" techniques currently under development and to be newly developed in the near future.

As the present invention may involve communications through Internet access (e.g., VoIP), the features of the present invention are also intended to be applicable to enhanced Internet access services, such as the so-called "Broadband convergence Network (BcN)," which is expected to provide Internet access service with speeds of 50~100 Mbps, roughly 50 times faster than conventional broadband services.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of processing a talk burst, the method comprising:
    displaying a list of all Push-To-Talk (PTT) terminals which are established in a PTT session;
    receiving a talk burst deny message from a PTT server in response to a talk burst request from another PTT terminal established in the PTT session, wherein the talk burst deny message comprises an identification (ID) of the PTT terminal that sent the talk burst request, wherein the talk burst deny message is simultaneously transmitted from the PTT server to all PTT terminals established in the PTT session when one PTT terminal established in the PTT session requests permission to send a talk burst and another PTT terminal established in the PTT session already has the talk burst;
    comparing the ID included in the talk burst deny message with a stored ID of the PTT terminal; and
    updating the displayed list of all PTT terminals which are established in the PTT session to distinguish the PTT terminal that failed to obtain the talk burst, wherein the displayed list of all PTT terminals established in the PTT session is updated as a result of comparing the ID included in the talk burst deny message with a stored ID of the PTT terminal and the updated displayed list of all PTT terminals established in the PTT session is the same so that a user can recognize a talk burst denied state,
    wherein updating the displayed list of all PTT terminals comprises:
        outputting a message indicating talk burst request failure if the stored ID and the ID included in the talk burst deny message are the same; and
        outputting a message indicating that a talk burst request corresponding to the ID has been denied if the stored ID and the ID included in the talk burst deny message are different.

2. The method of claim 1, wherein the talk burst deny message further comprises:
    a destination field set as broadcast mode; and
    a talk burst deny field.

3. The method of claim 1, wherein the message is output as at least one of text, image, or animation.

4. A method of processing a talk burst of a Push-To-Talk (PTT) service, the method comprising:
    displaying a list of all PTT terminals which are established in a PTT session;
    receiving a talk burst denial message broadcast from a PTT server in response to a talk burst request from another PTT terminal established in the PTT session, wherein the talk burst denial message comprises an identification (ID) of the PTT terminal that sent the talk burst request and is simultaneously transmitted from the PTT server to all PTT terminals-established in the PTT session when one PTT terminal established in the PTT session requests permission to send a talk burst and another PTT terminal established in the PTT session already has the talk burst;
    using the ID included in the talk burst denial message to determine PTT terminals established in the PTT session that failed to obtain the talk burst if a talk burst denial message is received by a PTT terminal established in the PTT session that did not send a talk burst request message; and
    updating the displayed list of all PTT terminals which are established in the PTT session to distinguish the PTT terminals that failed to obtain the talk burst, wherein the displayed list of all PTT terminals established in the PTT session is updated as a result of using the ID included in the talk burst denial message to determine the PTT terminals established in the PTT session that failed to obtain the talk burst, wherein the updated displayed list of all PTT terminals established in the PTT session is the same so that a user can recognize a talk burst denied state.

5. The method of claim 4, wherein the PTT terminals that failed to obtain the talk burst are distinguished by displaying at least one of text, image, or animation.

6. A server of a group communication system, comprising:
    a transceiver for sending and receiving communication signals;
    a processor associated with the transceiver; and
    a storage medium comprising instructions executable by the processor for:
        receiving a floor request from a user terminal established in a PTT session, granting or denying the floor request of the user terminal established in a PTT session, and informing each user terminal established in the PTT session about a floor request status of all user terminals established in the PTT session, wherein informing each user terminal established in the PTT session about the floor request status comprises sending a floor deny message identifying a specific user terminal established in the PTT session that was denied the floor request, wherein the floor deny message comprises a first field indicating a broadcast mode transmission, a second field indicating a floor request denial, and a third field indicating an identification of the specific user terminal that sent the floor request which was denied, and wherein the floor deny message is simultaneously transmitted from the PTT server to all of the user terminals established in the PTT session when one PTT terminal established in the PTT session requests permission to send a talk burst and another PTT terminal established in the PTT session already has the talk burst.

7. The server of claim 6, wherein the floor request is granted or denied according to conditions of the group communication system.

8. The server of claim 7, wherein the conditions of the group communication system comprise a situation where the floor request has already been granted to a user terminal that had sent a previous floor request.

9. The server of claim 6, wherein the group communication system supports a push-to-talk function.

10. A user terminal of a group communication system, the user terminal comprising:

a display for displaying a list of all Push-to-Talk (PTT) terminals which are established in a PTT session;

a transceiver to send and receive communication signals;

a processor associated with the transceiver; and a storage medium comprising instructions executable by the processor for:

sending a floor request to a server, receiving a floor grant or a floor deny from the server in response to a floor grant request from another PTT terminal established in the PTT session, wherein the floor grant or the floor deny comprises an identification (ID) for identifying the PTT terminal that sent the floor grant request, and the floor deny is simultaneously transmitted from the server to all PTT terminals established in the PTT session when one PTT terminal established in the PTT session requests permission to send a talk burst and another PTT terminal established in the PTT session already has the talk burst; and updating the displayed list of all PTT terminals which are established in the PTT session to distinguish the PTT terminals that received a floor grant or a floor deny, wherein the displayed list is updated according to the ID of the PTT terminal that sent the floor grant request, and the updated displayed list of all PTT terminals established in the PTT session is the same so that a user can recognize a talk burst denied state.

11. The user terminal of claim 10, wherein the PTT terminals that received the floor grant or the floor deny are distinguished by displaying at least one of an audible, visual or tactile indication.

12. The user terminal of claim 11, wherein the floor request status is indicated via graphics image processing.

* * * * *